April 13, 1954
J. M. BRADY
2,674,884
THERMOMETER
Filed Oct. 2, 1950
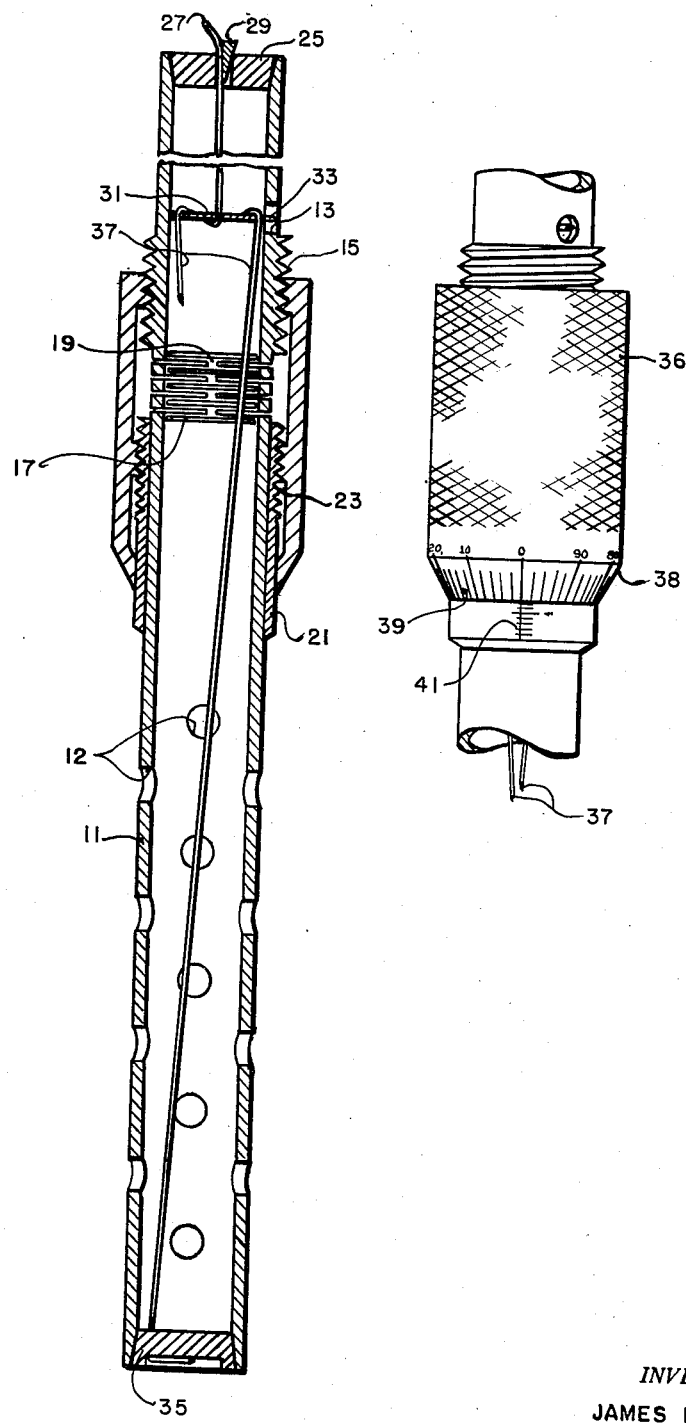
INVENTOR.
JAMES M. BRADY
BY
*Harry M. Saragovitz*
Attorney Patented Apr. 13, 1954

2,674,884

UNITED STATES PATENT OFFICE 2,674,884

THERMOMETER

James M. Brady, West Long Branch, N. J., assignor to the United States of America as represented by the Secretary of the Army Application October 2, 1950, Serial No. 188,045

6 Claims. (Cl. 73—363)

(Granted under Title 35, U. S. Code (1952), sec. 266)

The invention described herein may be manufactured and used by or for the Government for governmental purposes, without the payment of any royalty thereon.

The present invention relates to measuring devices, particularly to an instrument for measuring temperature.

In various types of measuring apparatus, and particularly in meteorological instruments, there is a continual need for measuring small quantities in relatively short periods of time. This is particularly apparent in measuring temperature under conditions where extremely rapid calculations of temperature ranges are to be made.

In many instances, the use of conventional mercurial thermometers in meteorological test equipment is not suitable as such thermometers have a large temperature lag, that is, one ranging from 30 seconds to 5 minutes depending upon the diameter of the bulbs.

It is therefore an object of the present invention to provide a frame or a casing for a temperature responsive device which will permit rapid calculations of temperature ranges.

Still another object of the invention is to provide a temperature responsive device including a casing having no linkages to introduce friction which may interfere with the sensitivity of the device.

In Patent No. 2,564,669, dated August 21, 1951, for "Pressure Measuring Device," I described a bifilar system wherein the respective ends of two thread-like elements are maintained in spaced relationship and one end of the system is secured against rotation about the axis of the system, but is free to move a limited distance along said axis and the other end thereof is secured against axial movement, but is free to rotate about said axis. There is also provided a suitable spring means to urge the rotatable end of the bifilar system into rotation in one sense of direction and maintain a taut relationship between the parts.

Specifically, the present invention includes incorporating such bifilar system into a frame or casing, preferably in the form of a ventilated tube, that is provided with a series of slots to permit the tube to be adjustable in length, but yet remain rigid to any torsional strain. Used in conjunction with the slotted casing or tube is a differential screw thread system disposed on the exterior of the tube whereby micrometric adjustments for lengthening or shortening the tube can be accomplished as desired.

The invention can best be understood from the following description, to be read in view of the accompanying drawing, in which, Fig. 1 is a longitudinal cross-sectional view of one embodiment of the invention, and Fig. 2 is an elevational view of part of an embodiment, which shows the temperature indicating device.

Referring particularly to the drawing, the supporting body of the system is shown in the form of a tube 11, having openings 12 to provide ventilation for the tube. Tube 11 is preferably made of a metal having a negligible coefficient of thermal expansion, such as a 36% nickel-iron alloy. Tube 11 is provided with an opening or a window 13, the function of which will be hereinafter set forth.

Below the window 13, the tube 11 is provided with an external thread 15 and with a lattice-like structure comprising a plurality of slots 17 and adjoining ribs 19, with each pair of slots extending circumferentially about the tube in lateral plane on opposite sides. The slots are arranged in opposing pairs, nine of such pairs being shown in the drawing (Fig. 1). Each slot extends slightly less than 180° about the tube, thereby leaving the rib section 19. Alternate or consecutive pairs of slots are 90° out of phase so that the ribs 19 are staggered to form a lattice-like structure, as shown. The lattice-like structure is so designed that it will permit the tube to have an adjustable length, but at the same time be relatively rigid when subjected to torsional strain.

Slightly below the lowermost slot 17, there is sweated to, or otherwise secured to the tube 11, an externally threaded sleeve 21, provided with screw threads 23. The screw threads 23 of the sleeve 21 have a different pitch from the screw threads 15, thereby forming a differential screw thread system.

Positioned in the top of the tube 11 is a plug 25 which has extending therethrough a torsion wire 27, preferably made of .003 diameter tungsten wire, and securely held therein by wedge 29. Rigidly secured to the lower end of the torsion wire 27 is a horizontally disposed disk-shaped upper rung 31, which rung has a diameter smaller than the inside diameter of the tube 11, thereby permitting the rung to rotate freely within the tube. Extending outwardly from one edge of said upper rung 31 is an index or pointer 33 which projects through and floats freely in dead center position in window 13 under balanced conditions. A disk-like rung 35, in the form of a plug, is rigidly secured or wedged into the lower end of the tube as shown. Two diametrically opposite points on the periphery of the upper rung are coupled to two diametrically opposite points on the periphery of the lower rung by a pair of wires 37, which will be referred to herein as the bifilar elements of the device. In the particular embodiment shown herein, the bifilar elements are made up, for convenience and ease of manufacture, of a single wire that is suitably secured at one end of the upper rung 31 and brought down through an opening in the lower rung 35 and brought up to the other end of the upper rung and permanently fastened thereto. In practice, I have found that the most desirable material for use as the bifilar elements of the system is a fine wire of .003 diameter of high tensile strength and possessing a high coefficient of expansion such as "Ni Span Hi," as manufactured by H. A. Wilson Company, Newark, New Jersey.

The rungs 31 and 35 are so adjusted axially and radially so that when the rungs 31 and 35 are about 170° out of phase, the system will be in tension and index 33 will float freely in window 13 in dead center position. It is to be understood that the specific values and dimensions set forth herein are cited merely as one example and are not to be construed as limiting the scope of the invention herein described, the values, dimensions, etc., may be changed as the needs require.

In engagement with the screw threads 15 of the tube 11, and screw threads 23 of the sleeve 21, is a thimble 36 having a conical end portion 38 upon which is inscribed an appropriate temperature scale 39 in any desired degree of graduation. The sleeve 21 is also provided with a temperature scale 41 along its vertical axis, which scale is read in conjunction with the scale or markings of the thimble 36. The scale 41 shows major graduations of temperature differentials, while the scale 39 of thimble 36 is graduated to show minor or lesser degree of graduation.

The operation of the thermometer herein described can be briefly set forth as follows: any temperature differential will effect an expansion or contraction of the bifilar wire 37. As the upper rung 31 is prevented from moving downwardly, by the torsion wires 27 to which it is attached, and from moving upwardly by being held by the wires 37 secured to the base plug 35, the rung 31 will be caused to rotate in either direction to allow the wires 37 to assume more or less angulated positions. Such rotation of rung 31 will cause the pointer, or index, 33 to move from its dead center position in the window 13. To compensate for this change in angular position of the bifilar wires, it is necessary to lengthen or shorten the tube 11. This is accomplished by turning the thimble 35 to the right or left as required, to either shorten or lengthen the tube, so as to bring the index 33 to its dead center position in the window 13. Such adjustments in the length of the tube are accomplished by the differential screw thread system heretofore described. The difference in values as read on the indicating scales will then be a determination of the temperature. It is obvious that the wires 37 are kept taut at all times by reason of the fact that the torsion wire 27 is urging the upper rung 31 in rotation. Any appropriate means, such as the wedge 29, can be used to allow adjustment of the torque of the torsion wire 27 and of tension upon the bifilar system.

While there has been shown in the drawings, and there has been described in detail one preferred form of my invention, it will be understood that it is not thereby intended to limit it to the specific form described, but to cover all modifications falling within the scope of the invention as expressed in the claims.

What is claimed is:

1. A temperature responsive device comprising a frame adjustable in length, a first rung, a torsion wire secured at one of its ends to the midpoint of said first rung, a second rung spaced from said first rung in the opposite direction from the torsion wire, two threads being variable in length with variations in temperature joining the two ends respectively of the first rung to the two ends respectively of the second rung, the outer end of the torsion wire and the second rung being secured against relative movements by said frame, and indicating means actuated by rotational movement of said first rung, said frame having a slotted portion to permit longitudinal adjustment thereof and provided with first and second screw threads of different pitch on its outer surface above and below said slotted portion, and means engageable with said screw threads to adjust the length of said frame along its longitudinal axis.

2. A measuring device comprising a frame adjustable in length along its axis, first and second rungs positioned in spaced parallel planes substantially perpendicular to said axis so that their approximate midpoints are intercepted by said axis, means securing said first rung to said frame preventing longitudinal movement of said rung relative to said frame but permitting rotational movement and urging said rung into one direction of rotation, and means securing said second rung to said frame to prevent its longitudinal movement relative to said frame, two thread-like elements being variable in length with variations in an atmospheric condition extending from the ends, respectively, of one rung to the ends of the other rung in a null angulated position, said frame having first and second screw threads, said first thread having a greater pitch than said second thread, and means engageable with both said screw threads for varying the length of said frame, whereby upon variations in said atmospheric condition the thread-like elements assume an angulated position different from that of the null angulated position and returned to said null angulated position by said last mentioned means.

3. In a measuring device, the combination comprising a casing including first and second members and a slotted portion intermediate said members to permit relative movement between said members, a bifilar system comprising a first rung, a torsion wire secured at one of its ends to the approximate midpoint of said first rung, and at its other end to said first member, a second rung spaced from said first rung in the opposite direction to the torsion wire and secured to said second member of said casing, whereby said torsion wire and said second rung are secured against relative longitudinal movement by said casing, and two threads being variable in length with variations in atmospheric condition joining the two ends, respectively, of the first rung to the two ends of the second rung, means to vary the longitudinal length of said casing, and means to indicate the relative longitudinal movement of said members, the amount of such movement being an indication of the change in atmospheric condition.

4. In a temperature responsive device comprising a casing and a bifilar system, said bifilar system including a first rung, a torsion wire secured at one of its ends to the approximate midpoint of said first rung and at its other end to said casing, a second rung spaced from said first rung in the opposite direction from the torsion wire, and held by said casing, two threads being variable in length with variations in temperature joining the two ends, respectively, of the first rung to the two ends of the second rung, the outer end of the torsion wire and the second rung being secured against relative rotational movements by said casing, said casing being provided with a lattice-like portion comprising a plurality of opposing pairs of slots and adjacent ribs, each pair of said slots extending circumferentially about the tube, first and second screw threads located respectively above and below said lattice-like portion, the threads of said screw threads being of different pitch, and a thimble engaging said screw threads whereby rotational movement of said thimble will adjust the length of said casing, said second rung and said torsion wire being held by said casing at portions thereof located on opposite sides of said lattice-like portion.

5. A temperature responsive device comprising in combination a frame adjustable in length along its axis, a rotatable rung and a fixed rung disposed in said frame transversely at spaced positions along the longitudinal axis of said frame, a torsion wire secured at one of its ends to the approximate mid-point of said first rung whereby the outer end of said torsion wire and said fixed rung are secured against relative rotational movement, two threads being variable in length with variations in temperature joining the two ends, respectively, of the first rung to the two ends, respectively, of the second rung, an indicating means affixed to and actuated by rotational movement of said first rung, a plurality of slots in said frame to permit longitudinal variation thereof, first screw threads on the outer surface of said frame, second screw threads contained upon a sleeve affixed to said frame, the pitch of said first screw threads being different from the pitch of said second screw threads and a thimble engagable upon said first and second screw threads, whereby rotational movement of said thimble will vary the longitudinal length of said frame said second rung and said torsion wire being held by said casing at portions thereof located on opposite sides of said slots.

6. A measuring device comprising a frame adjustable in length along its axis, first and second rungs positioned in spaced parallel planes substantially perpendicular to said axis so that their approximate midpoints are intercepted by said axis, means securing said first rung to said frame preventing longitudinal movement of said rung relative to said frame but permitting rotational movement and urging said rung into one direction of rotation, means securing said second rung to said frame to prevent its longitudinal movement relative to said frame, two thread-like elements being variable in length with variations in an atmospheric condition extending from the ends, respectively, of one rung to the ends of the other rung in a null angulated position, and which upon a change in atmospheric condition assume an angulated position different from that of said null angulated position, means to vary the longitudinal length of said frame whereby said thread-like elements are returned to the null angulated position and means to indicate the change in length of said frame, the amount of such change being an indication of the change in atmospheric condition.

References Cited in the file of this patent

UNITED STATES PATENTS

| Number | Name | Date |
|---|---|---|
| 618,260 | White | Jan. 24, 1899 |
| 2,523,498 | Copping | Sept. 26, 1950 |
| 2,564,669 | Brady | Aug. 21, 1951 |

FOREIGN PATENTS

| Number | Country | Date |
|---|---|---|
| 18,481 | Germany | Sept. 2, 1882 |
| 11,656 | Switzerland | Dec. 31, 1895 |